United States Patent Office 3,267,141
Patented August 16, 1966

3,267,141
PROCESS FOR PREPARING 4-HYDROXYPENTANE-
1,2 - DIONE-BIS-(2,4 - DINITRO-PHENYLHYDRA-
ZONE
Alexander D. Argoudelis, Kalamazoo, Mich., assignor to
The Upjohn Company, Kalamazoo, Mich., a corporation of Delaware
No Drawing. Filed Apr. 12, 1962, Ser. No. 186,866
1 Claim. (Cl. 260—566)

This invention relates to novel compositions of matter and to a process for the preparation thereof, and is particularly directed to the novel compounds 4-hydroxypentane-1,2-dione-bis(2,4-dinitrophenylhydrazone), 1-hydroxy-3-penten-2-one and 3-pentene-1,2-dione-bis(2,4-dinitrophenylhydrazone), and to a process for producing the same.

Actinospectacin is a biosynthetic product produced by the controlled fermentation of *Streptomyces spectabilis*. Various methods for the production, recovery, and purification of actinospectacin are described in the published literature, e.g., D. J. Mason et al., Antibiotics and Chemotherapy, 11, p. 118, 1961; M. E. Bergy et al., Antibiotics and Chemotherapy, 11, p. 661, 1961; Union of South Africa Patent No. 60/4098 and Belgian Patent No. 596,175. Actinospectacin is characterized by an optical rotation $[\alpha]_D^{25} = -20°$ ($H_2O$); by solubility in water, methanol, and ethanol, and by insolubility in acetone and hydrocarbon solvents; and by the presence of two basic groups: $pKa_1$ 6.95 ($H_2O$), $pKa_2$ 8.70 ($H_2O$). It was formerly thought that the molecular formula was $C_{14}H_{26}N_2O_7$, but it has since been shown that the formula is $C_{14}H_{24}N_2O_7$.

On alkaline treatment of actinospectacin there is obtained tetrahydro-3-hydroxy-5-methyl-2-[2,4,6-trihydroxy-3,5-bis(methylamino)cyclohexyloxy]-3-furoic acid which has been given the trivial name of actinospectinoic acid and which has the following structural formula:

I

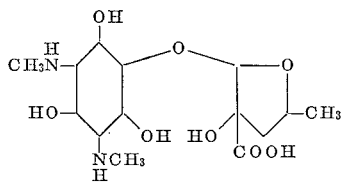

It has now been found that novel compounds according to this invention are obtained by reacting actinospectinoic acid with Brady's reagent (2,4-dinitrophenylhydrazine dissolved in 2 N HCl). On reacting actinospectinoic acid with Brady's reagent the actinospectinoic acid molecule is cleaved, yielding 1,3-deoxy-1,3-bis(methylamino)myoinositol, which has been named actinamine, and 4-hydroxy-pentane-1,2-dione-bis(2,4-dinitrophenylhydrazone) which can be represented by the following structural formula:

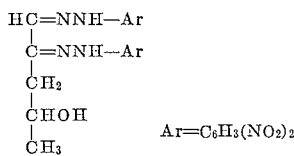

Novel compounds of the invention are also obtained when actinospectinoic acid is first treated with a mineral acid and the product thus formed is treated with Brady's reagent. For example, on reacting actinospectinoic acid (I) with 1 N aqueous sulfuric acid at reflux temperature the actinospectinoic acid molecule is cleaved at the glycosidic bond to yield actinamine (II) and 2,3-dihydroxy-5-methyltetrahydrofuran-3-carboxylic acid which has been named actinospectoic acid (III). Decarboxylation of the actinospectoic (III) acid results in the formation of 1-hydroxy-3-penten-2-one (IV). This latter compound is separated from the reaction mixture by steam distillation and then treated with a solution of Brady's reagent to form 3-pentene-1,2-dione-bis(2,4-dinitrophenylhydrazone) (V). The above reactions can be illustrated as follows:

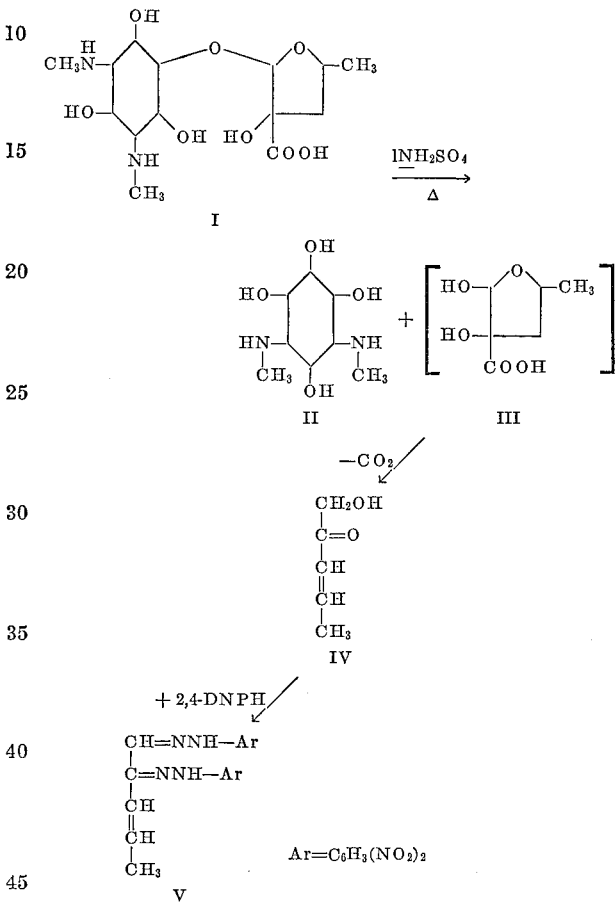

Alternate methods for making 4-hydroxypentane-1,2-dione - bis - (2,4 - dinitrophenylhydrazone) are available. When actinospectinoic acid (I) is reacted with a lower alkanol, e.g., methanol, ethanol, propanol, butanol, pentanol, hexanol, heptanol, octanol, and the like, in the presence of hydrogen chloride, which can be introduced as the gas or conveniently supplied by the use of a lower alkanoic acid chloride, e.g., acetyl, propionyl, butyryl, valeryl, caproyl, heptanoyl, caprylyl, and the like, a lower alkyl ester of 2-alkoxy-3-hydroxy-5-methyltetrahydrofuran-3-carboxylic acid is produced; concomitantly produced is an acid hydrolysis product of actinospectacin, actinamine. The lower alkyl ester of 2-alkoxy-3-hydroxy-5-methyltetrahydrofuran-3-carboxylic acid can then be reacted with 2,4-dinitrophenylhydrazine, in the presence of an acid, to produce 4-hydroxypentane-1,2-dione-bis(2,4-dinitrophenylhydrazone) (VI). Exemplificative of the above, actinospectinoic acid (I) can first be reacted with methanol in the presence of hydrochloric acid to produce actinamine dihydrochloride (II), and methyl 2-methoxy-3-hydroxy-5-methyltetrahydrofuran-3-carboxylate (IIIA), which has been given the trivial name methyl actinospectoic acid methyl ester. The methyl actinospectoic acid methyl ester (IIIA) can then be reacted with 2,4-dinitrophenylhydrazine in the presence of an acid to produce 4-hydroxypentane-1,2-dione-bis(2,4-dinitrophenylhydrazone) (VI).

Another method which can be used to make this compound proceeds by the periodate oxidation of acetinospectinoic acid (I) followed by treatment of the crude oxidation product (IIA), first with sodium borohydride and then with Brady's reagent. For example, actinospectinoic acid (I) can be reacted with a sodium metaperiodate solution for 2–3 hours and then the solution adjusted, advantageously, to a pH about 8 to 10.5 with a saturated aqueous barium hydroxide solution. Precipitated material can be conveniently removed by filtration. The solution can then be adjusted to a pH of about 7–8 by the addition of 2 N aqueous sulfuric acid. This solution can then be mixed with a solution of sodium borohydride and allowed to stand at room temperature for about one hour after which the solution can be further acidified to a pH of about 2, and then reacted with Brady's reagent to produce 4-hydroxypentane-1,2-dione-bis(2,4-dinitrophenylhydrazone) (VI).

The above reactions can be illustrated as follows:

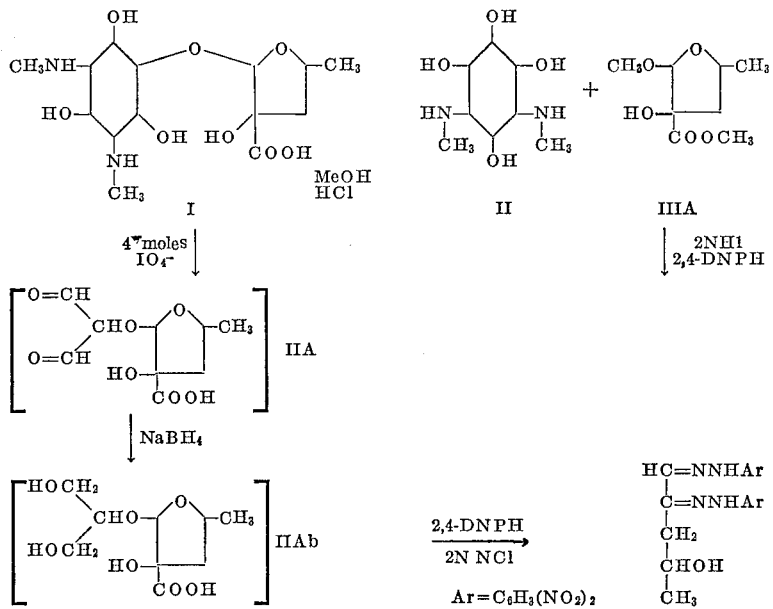

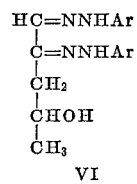

The novel compounds of the invention, 4-hydroxypentane-1,2-dione-bis(2,4-dinitrophenylhydrazone) (VI) and 3-pentene-1,2-dione-bis(2,4-dinitrophenylhydrazone) (V) exhibit characteristic absorption of light in the ultraviolet and visible region, and, accordingly, are useful in solutions or dispersed in plastic films, as light filters. The novel compound 1-hydroxy-3-pentene-2-one (IV) is useful as an intermediate for making 3-pentene-1,2-dione-bis(2,4-dinitrophenylhydrazone) in the manner shown above; it can also be used as a solvent or plasticizer for resins. Further, 1-hydroxy-3-pentene-2-one can be reacted with thiocyanic acid to produce a thiocyanate which is useful as an insecticide; it can also be used in the same manner as pyruvic acid to regenerate ketones; it can also be employed as an intermediate in making crotonaldehyde by first reacting with sodium borohydride and then with sodium metaperiodate.

The following examples are illustrative of the process and products of the present invention, but are not to be construed as limiting.

EXAMPLE 1

Actinospectinoic Acid (I)

A solution of 5.0 g. of actinospectacin in 250 ml. of 0.1 N barium hydroxide solution was allowed to stand at room temperature for 24 hours. The pH was adjusted to 9.0 with 2.0 N sulfuric acid, and the barium sulfate was removed by centrifugation. The remaining barium ion was removed by addition of sulfuric acid, and the resulting precipitate was removed by filtration through a filter aid. The remaining filtrate was evaporated to dryness under reduced pressure. The residue was then dissolved in 15 ml. of water, and 250 ml. of acetone was added. Refrigeration of this solution gave 4.52 g. of actinospectinoic acid crystals which had a melting point of 233 to 238° C. Two crystallizations from water-acetone gave a melting point of 230 to 235° C. The crystalline actinospectinoic acid had pKa' values of 3.3, 7.37, and 9.33; an optical rotation $[\alpha]_D^{25}$ —89° (c., 1.0% in $H_2O$); and characteristic infrared absorption at the following wave-lengths expressed in reciprocal centimeters:

| | |
|---|---|
| 3440 (S) | 1485 (S) |
| 3340 (S) | 1160 (S) |
| 3150 (S) | 1125 (S) |
| 2700 (S) | 1080 (S) |
| 2540 (S) | 1070 (S) |
| 1715 (W) | 1055 (S) |
| 1635 (S) | 1030 (S) |
| 1595 (S) | |

Elemental analysis.—Calculated for $C_{14}H_{26}N_2O_8$: C, 48.00; H, 7.43; N, 8.0; O, 36.55; molecular weight 350. Found: C, 47.73; H, 7.35; N, 8.17; O, 37.23; molecular weight: (elect. titr.) 369.

EXAMPLE 2

4-hydroxy-Pentane-1,2-Dione-Bis(2,4-Dinitrophenylhydrazone) (VI)

Two grams of actinospectinoic acid were dissolved in 35 ml. of 1 N aqueous hydrochloric acid. The solution was mixed with 1.7 liters of Brady's reagent (prepared by dissolving 1 g. of 2,4-dinitrophenylhydrazine in 1 liter of 2 N aqueous hydrochloric acid). The mixture was allowed to stand at room temperature for 21 hours. The precipitated orange material which formed was isolated by filtration and dried to yield 250 mg. of 4-hydroxypentane-1,2-dione-bis(2,4-dinitrophenylhydrazone), (preparation 1). The filtrate was allowed to stand at room temperature for 24 hours, after which time the additional precipitate which formed was isolated by filtration and dried to yield 350 mg. of 4-hydroxy-pentane-1,2-dione-bis(2,4-dinitrophenylhydrazone), (preparation 2). The filtrate was again allowed to stand at room temperature for 48 hours, after which the additional orange precipitate which formed was collected as above to yield 550 mg. of 4-hydroxy-pentane-1,2-dione-bis(2,4-dinitrophenylhydrazone), (preparation 3). Preparations 1, 2 and 3 were then recrystallized from acetone to give preparations 1A, 180 mg., 1B, 340 mg. and 1C, 500 mg., respectively. All three of these preparations of 4-hydroxypentane - 1,2 - dione-bis(2,4-dinitrophenylhydrazone) had identical melting points and U.V. and I.R. spectra.

Physical and analytical data:
Appearance: Orange needles.
Melting point: 247–249° C.
U.V. and visible spectrum (in absolute ethanol):

| λ max.: | a. |
|---|---|
| 244 (sh) | 34.65 |
| 255 (sh) | 32.30 |
| 295 (sh) | 8.98 |
| 400 | 71.12 |
| 437.5 | 75.94 |

Infrared spectrum: Absorption bands in reciprocal centimeters at the following frequencies: 3620, 2535, 3485, 3200, 3100, 1655, 1612, 1596, 1525, 1500, 1255, 1218, 1140, 1082, 1050, 740.

*Analysis.*—Calculated for $C_{17}H_{16}N_8O_9$: C, 42.89; H, 3.40; N, 23.54; O, 30.25. Found: C, 42.98; H, 3.71; N, 22.69; O, 30.57.

EXAMPLE 3

Five grams of actinospectinoic acid was dissolved in a mixture of 300 ml. of absolute methanol and 40 ml. of acetyl chloride. The solution was allowed to stand at room temperature for 31 hours after which the precipitated actinamine dihydrochloride was isolated by filtration and then dried. The filtrate was mixed with three liters of ethyl ether and additional amounts (330 mg.) of actinamine dihydrochloride was collected by filtration. The filtrate was then concentrated to a volume of 300 ml. One-half of this concentrate was then mixed with 650 ml. of Brady's reagent (prepared as described in Example 2). The mixture was allowed to stand at room temperature for 18 hours after which the orange precipitate which formed was isolated by filtration and dried to yield 350 mg. of 4-hydroxy-pentane-1,2-dione-bis(2,4-dinitrophenylhydrazone). This was recrystallized from acetone to yield 270 mg. The filtrate was allowed to stand at room temperature for 24 hours after which an additional amount of orange precipitate was isolated by filtration and dried to yield 200 mg. of 4-hydroxy-pentane-1,2-dione-bis(2,4-dinitrophenylhydrazone).

Physical and analytical data:
Appearance: Orange needles.
Melting point: 247–249° C.
U.V. and physical spectrum (absolute ethanol):

| λ max.: | a. |
|---|---|
| 244 (sh) | 37.85 |
| 296 (sh) | 10.51 |
| 400 | 76.00 |
| 435 | 80.53 |

Infrared spectrum: Absorption bands in reciprocal centimeters at the following frequencies: 3620, 3535, 3485, 3200, 3100, 1655, 1612, 1596, 1525, 1500, 1255, 1218, 1140, 1082, 1050, 740.

*Analysis.*—Calculated for $C_{17}H_{16}N_8O_9$: C, 42.89; H, 3.40; N, 23.54; O, 30.25. Found: C, 42.74; H, 3.34; N, 23.42; O, 30.50.

Optical rotation: $[\alpha]_D^{25}$ +345±50° (c., 0.454, nitrobenzene).

EXAMPLE 4

Two grams of actinospectinoic acid was dissolved in 400 ml. of 0.1 N aqueous sodium metaperiodate solution. The mixture was kept at room temperature for 2 hours and 40 min. Under these conditions, actinospectinoic acid reduced 4 moles of periodate. The solution was then adjusted to pH 9.5 with saturated aqueous barium hydroxide solution. The precipitated material was removed by filtration. The filtrate was adjusted to pH 7.5 by addition of 2 N aqueous sulfuric acid. The clear solution was then mixed with a solution containing 2 g. of sodium borohydride in 25 ml. of water. The mixture was allowed to stand at room temperature for 1 hour. The pH of the solution was then adjusted to 2.0 by dropwise addition of 1 N aqueous sulfuric acid and then mixed with 1.5 liters of Brady's reagent prepared as described in Example 2. The mixture was kept at room temperature for 48 hours. The orange precipitate which formed was isolated by filtration and dried to yield 600 mg. of 4-hydroxy-pentane - 1,2 - dione-bis(2,4-dinitrophenylhydrazone). This was recrystallized from acetone to yield 524 mg. of the above compound which had a melting point, U.V. and I.R. spectra identical to the preparations of 4-hydroxy-pentane-1,2-dione-bis(2,4-dinitrophenylhydrazone), described in Examples 2 and 3.

EXAMPLE 5

*1-Hydroxy-3-Penten-2-One (IV) and 3-Pentene-1,2-Dione-Bis-(2,4-Dinitrophenylhydrazone) (V)*

Five grams of actinospectinoic acid was dissolved in a mixture of 100 ml. of water and 200 ml. of 2 N aqueous sulfuric acid. The solution was heated to boiling and subjected to steam distillation. Steam-volatile materials, including unpurified 1-hydroxy-3-penten-2-one were collected in the distillate. Nine fractions of 200 ml. each of distillate were collected and analyzed by U.V. with the following results:

| Fraction No.: | OD [1] at 230 mμ |
|---|---|
| 1 | 116 |
| 2 | 90 |
| 3 | 70 |
| 4 | 50 |
| 5 | 40 |
| 6 | 33.5 |
| 7 | 22 |
| 8 | 16.5 |
| 9 | 13.2 |

[1] $O.D. = -\log T = -\log I/I_0$ where $T$ = transmittance
$I$ = Intensity of light transmitted by the solution being measured
$I_0$ = intensity of light transmitted by the solvent alone Each of the nine fractions of unpurified 1-hydroxy-3-penten-2-one was mixed separately with 750 ml. of a solution of 2,4-dinitrophenylhydrazine prepared by dissolving 1 g. of 2,4-dinitrophenylhydrazine in 1 liter of 2 N aqueous hydrochloric acid. The mixtures were allowed to stand at room temperature for 24 hours. The precipitated orange material which formed in each fraction was isolated by filtration and combined to yield 2.25 g. of preparation 1. Two grams of preparation 1 were recrystallized from acetone to give 1.2 g. of 3-pentene-1, 2-dione-bis(2,4-dinitrophenylhydrazone) which was a bright red crystalline material having a melting point of 222–227° C. Five hundred milligrams of this latter preparation were recrystallized from acetone to yield 400 mg. of a highly purified preparation of 3-pentene-1,2-dione-bis-(2,4-dinitrophenylhydrazone) which had the following physical and chemical properties:

*Elemental analysis.*—Calculated for $C_{17}H_{14}N_8O_8$: C, 44.58; H, 3.10; N, 24.47; O, 27.95. Found: C, 44.76; H, 3.92; N, 21.88; O, 28.46.

Melting point: 223–225° C.
Optical rotation: $[\alpha]_D^{25} = 0$.
U.V. and visible (in ethanol):

| λ max.: | a. |
|---|---|
| 244 (sh) | 10.75 |
| 400 | 20.65 |
| 430 | 21.29 |
| 296 (sh), none. | |

Infrared absorption at the following frequencies in reciprocal centimeters: 3295, 3260, 3095, 1612, 1590, 1540, 1500, 1217, 1136, 1086, 1050, 738.

I claim:

A process for preparing 4-hydroxy-pentane-1,2-dione-bis(2,4-dinitrophenylhydrazone) which comprises (1) reacting actinospectinoic acid with an excess of a solution consisting of 2,4-dinitrophenylhydrazine and hydrochloric acid to produce 4-hydroxypentane-1,2-dione-bis-(2,4-dinitrophenylhydrazone) and actinamine, and (2) isolating the 4-hydroxy-pentane-1,2-dione-bis(2,4-dinitrophenylhydrazone) so produced.

References Cited by the Examiner

UNITED STATES PATENTS

| | | | |
|---|---|---|---|
| 2,262,817 | 11/1941 | Peck | 260—594 |
| 2,515,304 | 7/1950 | Jones | 260—483 |
| 2,550,745 | 5/1951 | Wilder et al. | 260—594 |
| 2,760,952 | 8/1956 | Grimme et al. | 260—594 X |
| 2,883,423 | 4/1959 | Mosher et al. | 260—566 |
| 2,955,140 | 10/1960 | Hofer et al. | 260—594 X |
| 2,978,467 | 4/1961 | Klager | 260—594 X |
| 2,978,667 | 4/1961 | Klager | 260—594 X |
| 2,999,112 | 9/1961 | Saunders | 260—566 |

FOREIGN PATENTS

| | | |
|---|---|---|
| 903,685 | 1/1945 | France. |
| 702,403 | 1/1954 | Great Britain. |
| 830,866 | 3/1960 | Great Britain. |
| 454,069 | 3/1949 | Italy. |

OTHER REFERENCES

Adams et al.: "Organic Reactions," vol. II, pp. 341–375 (1944).

Bokodia et al.: J. Indian Chem. Soc., vol. 29, pp. 409–414 (1952).

Berkoffer, Ann. der Chem., vol. 608, pp. 7–17 (1957).

Charlesworth et al.: Can. J. Chem., vol. 34, pp. 376–382 (1950).

Hata et al.: C.A., vol. 54, pp. 24619i (1960).

Lettenbauer et al., Ann. der. Chem., vol. 625, pp. 140–146 (1959).

Lewis, J. Chem. Soc. (London), vol. of 1957, pp. 531–537.

Lewis, J. Chem. Soc. (London), vol. of 1961, pp. 4690–4691.

Migrdichian, "Organic Synthesis," vol. 1, p. 79 (1957).

Reppe, Ann. der. Chem., vol. 596, pp. 39–79 (1955).

Riobe, Comptes rend., vol. 236, pp. 2125–2154 (1953).

Wagner et al.: "Synthetic Organic Chemistry," pp. 480–482 (1935).

Theilheimer, Synthetic Methods in Organic Chemistry, vol. 7, p. 176 (1953).

Rodd, Chemistry of Carbon Compounds, vol. 1A, pp. 729–730 (1951).

CHARLES B. PARKER, *Primary Examiner.*

LEON ZITVER, *Examiner.*

F. D. HIGEL, *Assistant Examiner.*